(12) United States Patent
Gouraud

(10) Patent No.: US 8,006,009 B2
(45) Date of Patent: Aug. 23, 2011

(54) METHODS AND DEVICE FOR IMPLEMENTING MULTIFUNCTION PERIPHERAL DEVICES WITH A SINGLE STANDARD PERIPHERAL DEVICE DRIVER

(76) Inventor: Thierry Gouraud, Ave du Grand Parc (FR)

( * ) Notice: Subject to any disclaimer, the term of this patent is extended or adjusted under 35 U.S.C. 154(b) by 17 days.

(21) Appl. No.: 12/454,510

(22) Filed: May 19, 2009

(65) Prior Publication Data

US 2010/0235545 A1     Sep. 16, 2010

(30) Foreign Application Priority Data

May 21, 2008   (FR) ...................................... 08 53305

(51) Int. Cl.
*G06F 13/12*     (2006.01)
*G06F 3/00*      (2006.01)
(52) U.S. Cl. ............................. 710/62; 710/5; 719/321
(58) Field of Classification Search ........................ None
See application file for complete search history.

(56) References Cited

U.S. PATENT DOCUMENTS

2005/0044172 A1 *   2/2005   Philyaw ........................ 709/217

FOREIGN PATENT DOCUMENTS

FR            08 53305         5/2009

OTHER PUBLICATIONS

French Search Report for 08 53305.

\* cited by examiner

*Primary Examiner* — Alan Chen

(57) ABSTRACT

Disclosed is a method and associated apparatus for defining an interface between a peripheral device and a computer application using standard driver(s) without use of specific peripheral device drivers. The method provides for processing one command in a multifunction peripheral device comprising a communication interface capable of connecting the peripheral device to a host system, the processing being in accordance with at least one of the functions of the multifunction peripheral device, called first function. After reception, the command is processed according to the first function and analyzed to determine whether at least one specific parameter related to at least one other function, separate from the first function, called second function, is associated with said one command. In response to said analysis, if at least one specific parameter related to said second function is associated with the one command, a request related to the second function is executed.

8 Claims, 4 Drawing Sheets

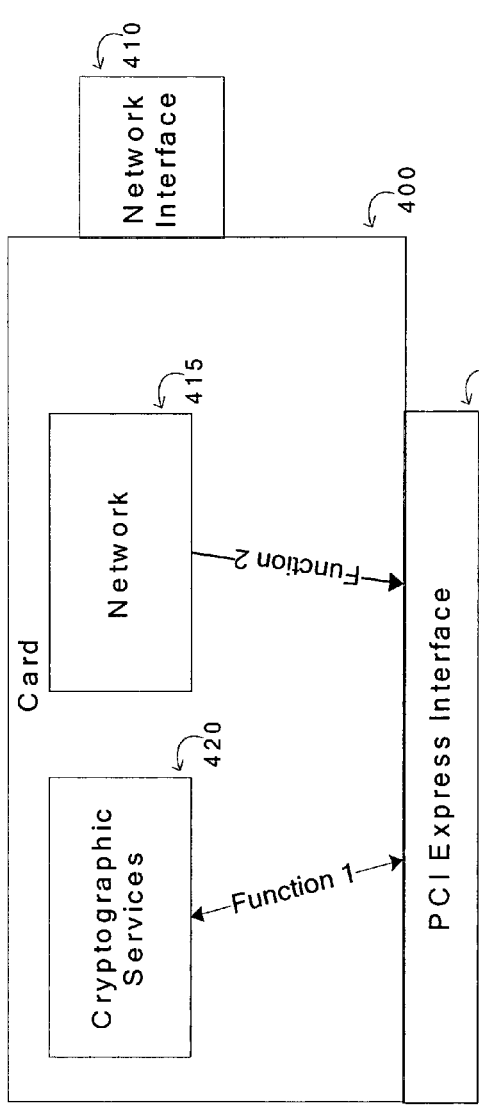
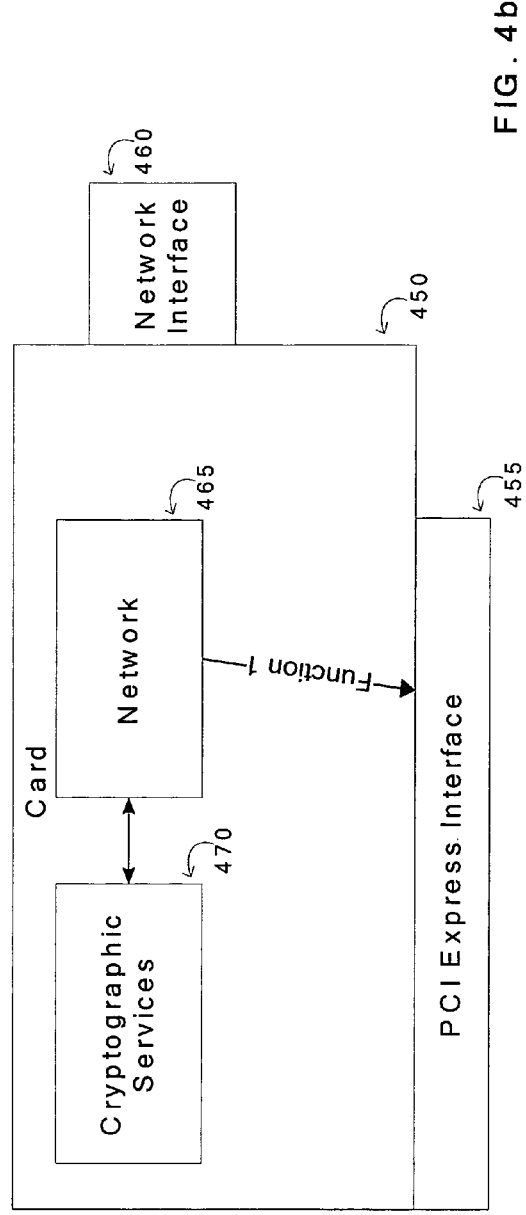
FIG. 4a
FIG. 4b

METHODS AND DEVICE FOR IMPLEMENTING MULTIFUNCTION PERIPHERAL DEVICES WITH A SINGLE STANDARD PERIPHERAL DEVICE DRIVER

BACKGROUND OF THE INVENTION

The present invention relates to the interfaces between a host system and a peripheral device and more particularly to methods and a device for implementing multifunction peripheral devices, in particular USB multifunction peripheral devices, with a single standard peripheral device driver, (that is, without a specific peripheral device driver).

There are many USB peripheral devices, for example storage, pointing or data security devices, being able to be connected to a host system comprising an operating system and applications executed on this system.

To enable the exchange of data between a USB peripheral device and the host system, the operating system of the latter comprises one or more peripheral device drivers enabling a peripheral device to be accessed and used. In many cases, the peripheral devices can be implemented with standard peripheral device drivers, integrated into the operating system.

Nevertheless, in modern operating systems, it is generally possible for a peripheral device manufacturer to supply a peripheral device driver independently from the supplier of the operating system. In this case, the peripheral devices are, for example, delivered with a CDROM containing the corresponding driver(s).

Moreover, it is generally necessary to possess certain computer or system administration rights to be able to install a new peripheral device driver. Further, in some operating systems, the peripheral device drivers can or must be signed, that is be authenticated in a cryptographic manner by the operating system, for purposes such as security and determining correctness of the driver and its installation.

The access to the peripheral device by an application executed on the host system is realized by means of an interface called an API (acronym for Application Programming Interface) that defines the manner in which one software component can communicate with another, and in particular for this discussion, the interface to communicate with a peripheral device driver.

It is noted that a USB peripheral device may provide a certain number of services for the operating systems as well as for the applications. The USB standard defines a "class" of a USB peripheral device, this class can be considered as the definition of the interfaces between the peripheral device and the host system. Knowing the class of a USB peripheral device typically enables the host system to implement a driver for this peripheral device and enable another supplier of peripheral devices to implement a compatible peripheral device realizing analogous functions.

The USB standard defines the standard classes such as mass memories and network interfaces.

The USB standard also provides the possibility of describing a peripheral device as being composite. Such a peripheral device is generally called a composite peripheral device or multifunction peripheral device. It enables several functions to be implemented within one peripheral device, for example a mass memory function and a network interface function. Each function can execute different requests, a request being for example the writing, the reading, the encryption or the decryption of an item of data. A multifunction peripheral device can be considered as an agglomeration of several sub-peripheral devices, each defining its own class. A host system generally sees this peripheral device through several drivers: a multifunction driver that manages the agglomeration and then also typically one driver per sub-peripheral device that is per function.

The USB standard also enables a USB peripheral device to implement a class not defined by the standard. In this case, the supplier of the peripheral device must typically provide a specific driver for the peripheral device for each different operating system that the supplier wants to provide support.

For example, a cryptographic peripheral device can provide a secure storage as well as the PKCS#11 services describing certain services and cryptographic APIs. (PKCS stands for Public Key Cryptography Standard, and PKCS #11 is the PKCS Cryptographic Token Interface Standard. PKCS is a known standard utilized by the RSA Company). The peripheral device must typically then implement the mass storage class and a PKCS#11 class that is specific to it.

FIG. 1 illustrates an implementation example of such a multifunction peripheral device comprising a secure storage and offering PKCS#11 services.

The host system 100 is here connected to a peripheral device 105 comprising a secure storage and offering the PKCS#11 services 170 via a USB bus 110.

The applications 115 implementing the storage functions of the peripheral device use the file system driver 120 itself using the USB storage driver 125, that is a USB storage standard driver. The USB storage driver 125 calls a USB multifunction driver 130 using a USB bus driver 135.

In the same manner, the applications 140 implementing the PKCS#11 services call a PKCS#11 library 145 that is based on a PKCS#11 driver 150, that is a driver specific to the PKCS#11 services. Like the USB storage driver 125, the PKCS#11 driver 150 calls the USB multifunction driver 130 using the USB bus driver 135.

In the peripheral device 105, the secure storage services 155 use a USB storage driver 160 that itself calls a USB bus driver 165.

In a similar manner, the PKCS#11 services 170 of the peripheral device 105 use a PKCS#11 driver 175 that itself calls the USB bus driver 165.

However, the interfacing of the USB peripheral device with an application being executed on the host system poses several technical problems.

First of all, a given operating system only provides USB peripheral device drivers for certain classes of peripheral devices. These peripheral device classes generally correspond to the most widely used peripheral devices such as keyboards, mice and keys or USB disks.

Moreover, even if the services provided by a peripheral device are defined by a standard, the mechanisms used to implement the interface are not always defined. For example in the case of a peripheral device providing the services defined by PKCS# 11, the APIs are defined between the applications using PKCS#11 and the suppliers of PKCS#11 libraries but the interface between the library and the peripheral device is not covered by the standard, which explains why that there is no standard driver to interface the library and the peripheral device.

It can also be observed that a USB peripheral device should preferably be useable with several types of operating systems. It can also be used before or during the start up of an operating system. In this case, the peripheral device must typically be identified according to one of the classes supported by the BIOS (acronym for Basic Input Output System) so that the BIOS can access it. There are many different BIOSs and most do not implement all the protocols and classes defined by the USB consortium. In particular, some BIOSs can refuse to function with a composite peripheral device even if they might correctly support one of its classes.

For example, there are some BIOSs capable of starting on a USB disk but incapable of starting on a peripheral device identified as a composite peripheral device of which one of the classes is the disk class. However, it can be essential to start on a cryptographic peripheral device providing a secure storage. It is therefore important or advantageous that any BIOS supporting the start up on a USB disk can start on such a secure peripheral device (composite peripheral device).

It will also be observed that the installation of a peripheral device driver generally requires high administration rights in the host system. Moreover, the operating system may limit or even prohibit the installation of unsigned drivers, which implies having to sign the specific driver. This prohibition or decision for requirement is generally made at the discretion of the supplier of the host system.

Moreover, it may be necessary to supply one peripheral device driver for each version of the operating system. Because of these complexities, the development cost and effort in terms of tests and validation of the driver by the supplier of the peripheral device to provide all of the required drivers can become unacceptable and may lead a supplier to limit the breadth of support of his peripheral device to a small number of operating systems and versions.

Further, the small space required and the functionalities of certain USB peripheral devices encourage their use in "nomad" mode that is their use on a computer not belonging to the owner of the peripheral device. For example, a cryptographic peripheral device can be used in a cybercafé to enable the encryption and the signature of e-mails. In this type of use, the user of the peripheral device rarely has the possibility or sufficient rights to install a driver specific to the peripheral device on the computer or machine that he is using.

BRIEF SUMMARY OF THE INVENTION

The present invention relates to information systems in which a peripheral device, for example a USB peripheral device, and an application running on an operating system of a host system need to communicate with each other. The invention is used to define an interface between the peripheral device and the application using one or more drivers of the operating system, without requiring the use of specific peripheral device drivers. Only standard peripheral device drivers are implemented.

Although for illustrative purposes the description of the illustrated embodiment utilizes USB peripheral devices providing cryptographic services comprising a secure storage and PKCS#11 services, the peripheral devices in accordance with the invention can be of different or other types.

In accordance with the invention, the peripheral devices are identified as peripheral devices of a standard class supported by most operating systems and BIOSs. Hence, in spite of their composite nature, they are not recognized as such.

According to an illustrated embodiment, the present invention is directed to a method of processing at least one command in a multifunction peripheral device located within a host system which includes a communication interface capable of connecting said peripheral device to the host system. The command is defined in accordance with at least one of the functions of said multifunction peripheral device, called first function. According to the method, the command is received and processed according to said first function. The command is analyzed to determine whether at least one specific parameter related to at least one other or second function of the multifunction peripheral device, separate from said first function is associated with the one command. If the specific parameter related to the other function is associated with the one command, a request related to the other function is executed. This method enables a multifunction peripheral device to be connected to a host system that only implements a single peripheral device driver.

Further, the multifunction peripheral device is able to be identified by the host system as a standard peripheral device capable of implementing said first function. This enables the host system to use a standard peripheral device driver, without requiring the development and installation of one or more particular peripheral device drivers.

The illustrated embodiments of the invention described hereafter are directed to methods and apparatus solving one or more of the problems described above. The description in the brief summary which is just below is not meant to be limiting. The entire specification including the figures and the claims is meant to be considered in description of the invention as described specifically in the claims.

The specific features of the peripheral device are here generated by an application and/or a library being executed on the host system at the request of the user. The application and/or the library only use the services of the standard class to implement an exchange of specific data with the peripheral device; it is therefore no longer necessary to install a specific peripheral device driver. In other words, the specific functions and the corresponding data are not transmitted as instructions but as simple data, the latter being transmitted using the functions of the standard peripheral device driver.

The implementation of this mechanism thus can avoid the installation of specific peripheral device drivers. The peripheral device is thus likely to be supported by different BIOSs as well as by different operating systems supporting the standard class of the peripheral device.

Moreover, the use of such a peripheral device according to a nomadic mode is simplified in that the software supplied with the peripheral device is limited to applications and/or libraries, and does not require specific and/or customized device drivers or operating system specific modules. ("Nomadic" meaning that the peripheral device is plugged into a computer or computer system not necessarily owned by the user, or to which the user does not have full privileges). It is thus unnecessary to possibly require with the software the installation of system software modules, which provides for the support of a greater number of operating systems and versions to be considered.

EXAMPLE IMPLEMENTATION OF METHOD OF THE PRESENT INVENTION

According to a particular illustrated embodiment, the invention is implemented in the system described with reference to FIGS. 1 and 2 wherein a peripheral device offering a first function of secure storage and a second function of PKCS#11 services is connected to a host system.

The cryptographic peripheral device is here identified according to its first function that is as a peripheral device belonging to the standard class of mass storage. The access to the secure storage of this cryptographic peripheral device is consequently implemented according to the services of the standard class of mass storage.

The second function, that is here the PKCS#11 services, is accessed by means of a PKCS#11 library that implements a mechanism based on the writing and reading of data in a storage zone of the peripheral device. Hence, the requests are transmitted in the form of data associated with particular files, that is in the form of file write commands, whereas the responses to these requests are obtained by the reading of specific files. The files comprising the requests are interpreted by the peripheral device to execute the requests targeted and to generate the files comprising the responses to these requests.

Such files are particular in the sense that they do not participate in the secure storage function but serve as an exchange zone between the library and the peripheral device.

Hence, for example, a specific file having the name REQ_EXEC can be used to transmit requests to the peripheral device and a file called REQ_REP is used to access the responses to the requests. The REQ_EXEC and REQ_REP files are stored in a memory of the peripheral device, preferably the mass memory, which is used, in part, as exchange zone between the peripheral device and the host system.

It is advisable to note that several files corresponding to requests can be used. Likewise, several files corresponding to responses to requests can be used. It is also possible to use a same file to store alternately the requests and the responses to the requests.

In a simplified manner, when an application executed by the host system needs to access a PKCS#11 service, it calls the corresponding library that transmits the request and the associated data in the form of data to write to the file REQ_EXEC in the peripheral device. Following the reception of a write command of a file, the peripheral device determines whether the write command concerns the file or the files used to receive the requests related to the PKCS#11 services that is here whether the write command targets the REQ_EXEC file. In the affirmative, the peripheral device analyzes the content of this file to extract the request related to the PKCS#11 services, executes this request according to the associated data stored in the REQ_EXEC file, or whose references are indicated in this file, and writes the response to this request in the REQ_REP file.

After writing the data of the REQ_EXEC file, the PKCS#11 library reads the content of the REQ_REP file by means of the corresponding command to obtain the response to the request.

It will however be noted that the data write and read commands, notably in storage peripheral devices of the USB type, are not targeted at files as such but sectors. A file management system is implemented in the host system to convert files into sectors. A precise knowledge of the structure of the file system is thus used by the operating systems to realize the translation of the file read/write requests into sector read/write requests.

The peripheral device must typically be able to establish the reverse conversion that is convert sectors into files, to access the file representing the requests and write the responses to these requests to a file. The implementation of the invention as previously described therefore requires a precise knowledge of the file system used by the peripheral device.

There are however many types of file drivers such as FAT (File Allocation Table), FAT32 (similar to FAT but using addresses coded in 28 bits) and NTFS (acronym for NT File System).

Moreover, the host system and its user having full latitude to choose the file system used on a given disk, the peripheral device must typically be capable of taking into account all the possible types of file driver.

However, the peripheral device does not generally have the necessary resources to implement all the possible file systems.

One exemplary solution is implementing one or more special files in a particular disk of the peripheral device (the standard class of mass storage enables a USB peripheral device to have several disks). The choice of file system used for this particular disk is then determined by the peripheral device. The file system is, preferably, chosen from the ones supported by the greatest number of operating systems.

The particular disk is, preferably, identified by a label and/or by a documentation file present on the disk as not having to and, advantageously, not being able to be used to store information of a user but as being reserved for the PKCS#11 library.

Hence, the particular disk is accessed through a predetermined file driver whereas the disk or disks enabling a user to store data are accessed through the file driver chosen by the user and/or imposed by the operating system.

The invention relates to a method for implementing at least one service of a multifunction peripheral device comprising a communication interface capable of connecting said peripheral device to a host system, said at least one service being called by at least one command in accordance with at least one of the functions of said multifunction peripheral device, called first function, wherein the method comprises the following steps:

determining the function of said multifunction peripheral device to which belongs said at least one service, and if said at least one service does not belong to said first function, associating said at least one command with a reference to said at least one service and with at least one specific parameter to said function of said multifunction peripheral device to which belongs said at least one service.

The method according to the invention thus enables a host system, during the connection of a multifunction peripheral device, to implement only a single peripheral device driver.

In another illustrated embodiment, the invention is directed to a device for a multifunction peripheral device which is a communication interface capable of connecting said peripheral device to a host system. The provides processing means for handling at least one command received through the communication interface, the command being in accordance with at least one of the functions of the multifunction peripheral device, and enables the execution of a request associated with said at least one command by at least one other function, separate from the first function. In an advantageous manner, the device provides identification means of the peripheral device as a standard peripheral device capable of implementing the first function.

In a further illustrated embodiment, the device provides processing means of at least one specific parameter associated with at least one command to identify a second function. The device further includes conversion means to obtain the one specific parameter from at least one item of data associated with the one command. The device in this illustrated embodiment is thus capable of taking into account possible specific features related to said first function.

According to a further illustrated embodiment, a peripheral device is capable of implementing storage, cryptographic and/or network interface functions. The first function is for example a storage function or a network interface function.

It is noted that the type of device, that is, the connection of a peripheral device can be by various interfaces with the interfaces in this specification and in description of illustrated embodiments, such as of the USB or PCI type, being exemplary.

BRIEF DESCRIPTION OF THE SEVERAL VIEWS OF THE DRAWING

The invention will be better understood by means of the following description, given only as an example and in reference to the attached drawings. Other advantages, purposes and characteristics of the present invention will emerge from the following detailed description and with reference to the attached drawings, in which:

FIGS. 4a and 4b, represents an implementation example of a multifunction peripheral device comprising a network interface and offering PKCS#11 services, in a standard manner and in accordance with the invention, respectively.

DETAILED DESCRIPTION OF THE INVENTION

Figure 1:
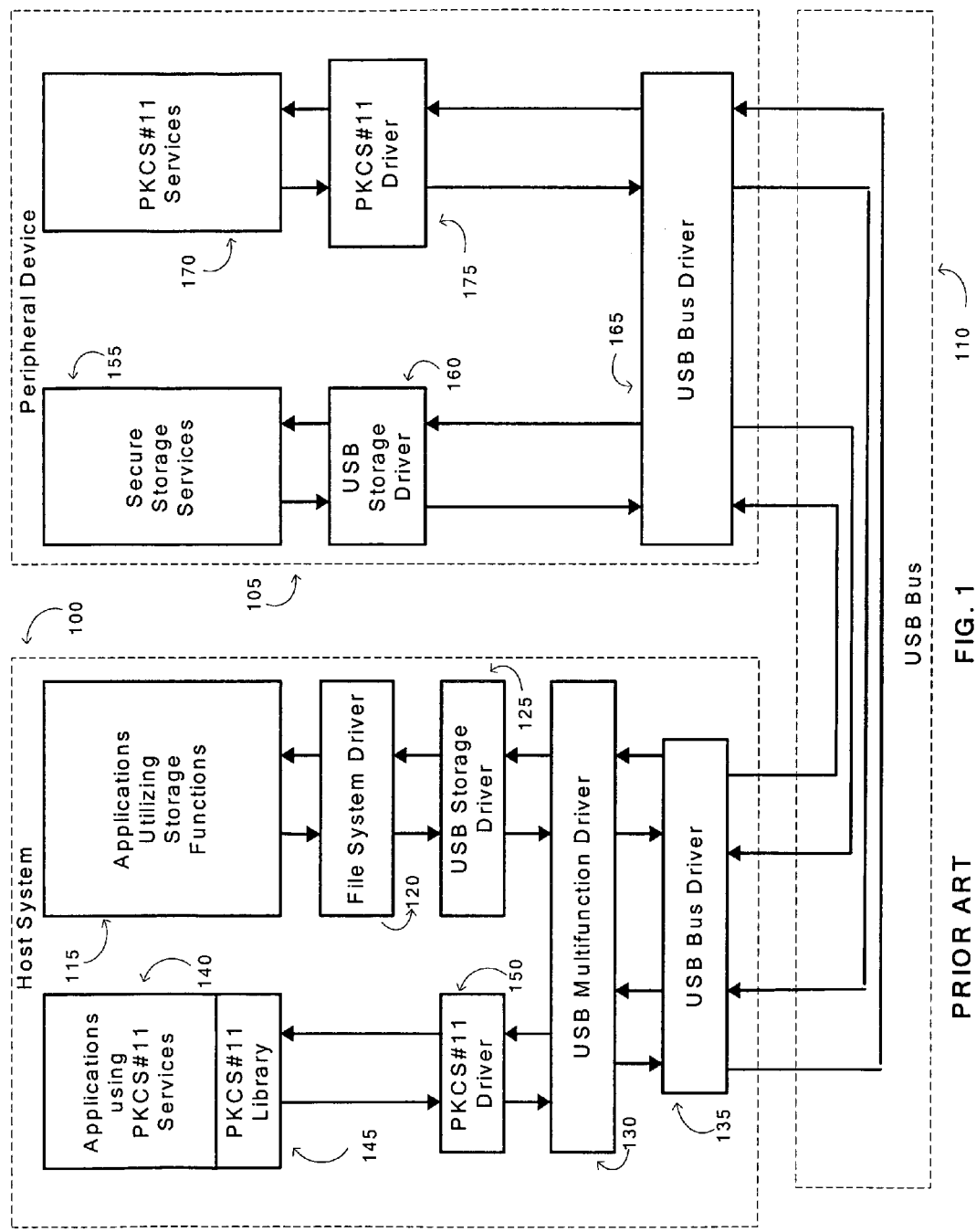
FIG. 1 illustrates a standard implementation example of a multifunction peripheral device comprising a secure storage and offering PKCS#11 services.

FIG. 1 is described in the Background of the Invention.

Figure 2:
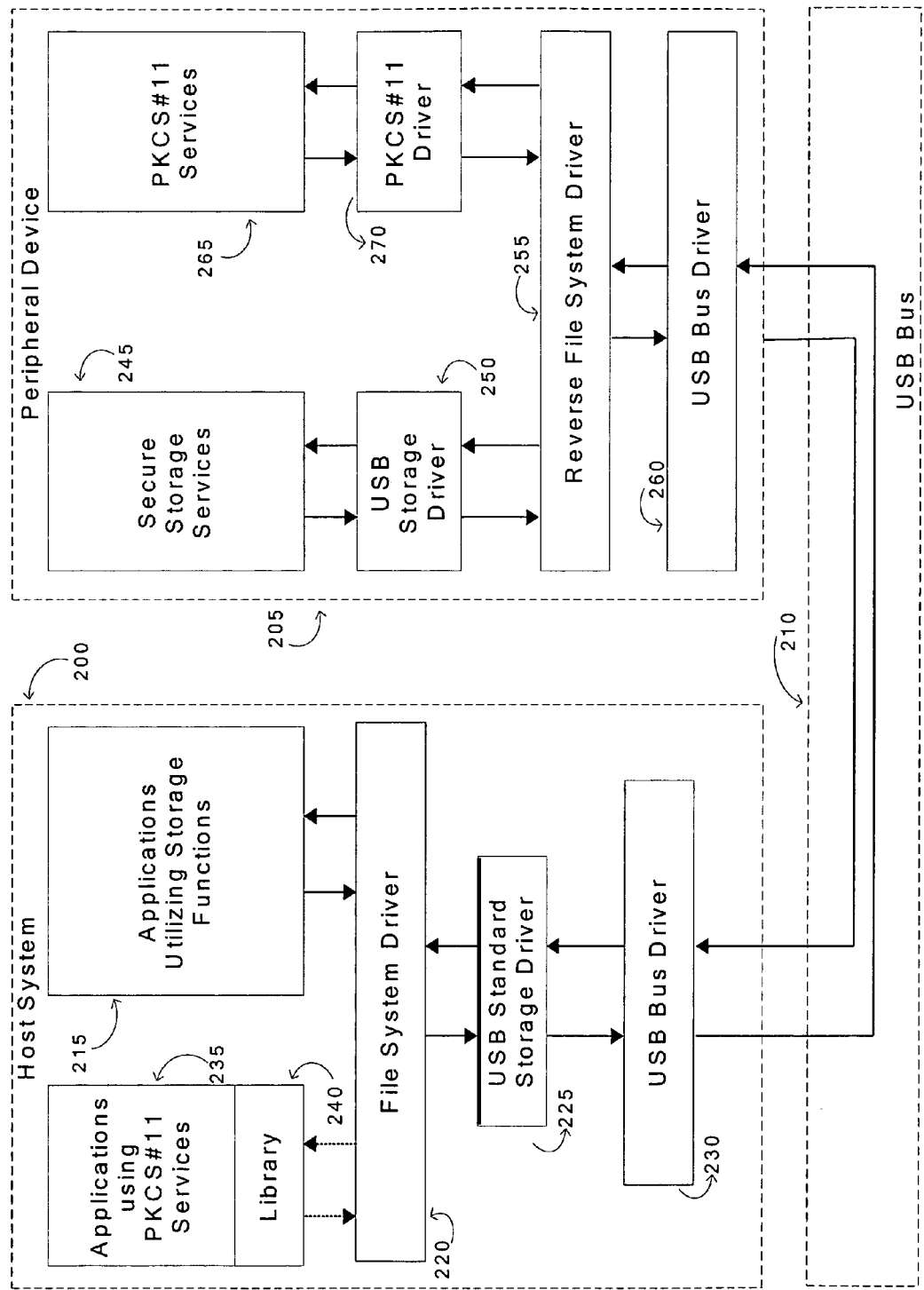
FIG. 2 illustrates an implementation example of a multifunction peripheral device comprising a secure storage and offering PKCS#11 services, in accordance with the invention.

FIG. 2 illustrates an implementation example of a multifunction peripheral device comprising a secure storage and offering PKCS#11 services, in accordance with the invention. The peripheral device shown diagrammatically here in FIG. 2 offers the same services to the user as the one shown in FIG. 1.

The host system 200 in FIG. 2 is connected to a peripheral device 205 comprising a secure storage and offering PKCS#11 services via a USB bus 210.

The applications 215 implementing the storage functions of the peripheral device use a file system driver 220 enabling the files to be converted into sectors. The file system driver 220, determined or selected by the user or the operating system during the configuration of the peripheral device, itself uses a USB storage driver 225, that is a standard USB storage driver. The USB storage driver 225 calls a USB bus driver 230.

The set formed by the reference numbers 215 to 230 uses the general principles implemented to store data and access the latter in a standard class peripheral device of mass storage.

The applications 235 implementing the PKCS#11 services call a PKCS#11 library 240 that transforms the requests to the PKCS#11 services 265 into a command to write these requests to files of the peripheral device. The PKCS#11 library 240 uses a file system driver 220, determined by the peripheral device, to convert the file write commands into sector write commands.

Likewise, the PKCS#11 library 240 transmits file read commands to the peripheral device to obtain the responses to the requests submitted. Again, the PKCS#11 library 240 uses the file system driver 220 determined by the peripheral device to convert the file read commands into sector read commands.

In the peripheral device 205, a secure storage services 245 are based on a USB storage driver 250 that itself is based on a reverse file system driver 255 connected to a USB bus driver 260.

In a similar manner, the PKCS#11 265 services are based on a PKCS#11 driver 270 that itself is based on the reverse file system driver 255 connected to the USB bus driver 260.

When the reverse file system driver 255 receives a sector read or write command, it determines which disk the sector belongs to.

If the sector belongs to a disk enabling the user to store data or access the latter, the command is transmitted to the USB storage driver 250 that processes the command in a standard manner.

If the sector belongs to the particular disk used to store the special file, the command is transmitted to the USB storage driver 250 that processes the command in a standard manner to read or write the corresponding data in a standard manner. In parallel, if the command is a write command, the reverse file system driver 255 is used to determine the file or files used to transmit the requests related to the PKCS#11 services 265 and a PKCS#11 driver 270 is activated to access the files thus determined (chosen or selected) to execute the request or requests contained in the latter and to write the result of these requests to the response file or files used.

Description of Operation

Figures 3A, 3B:
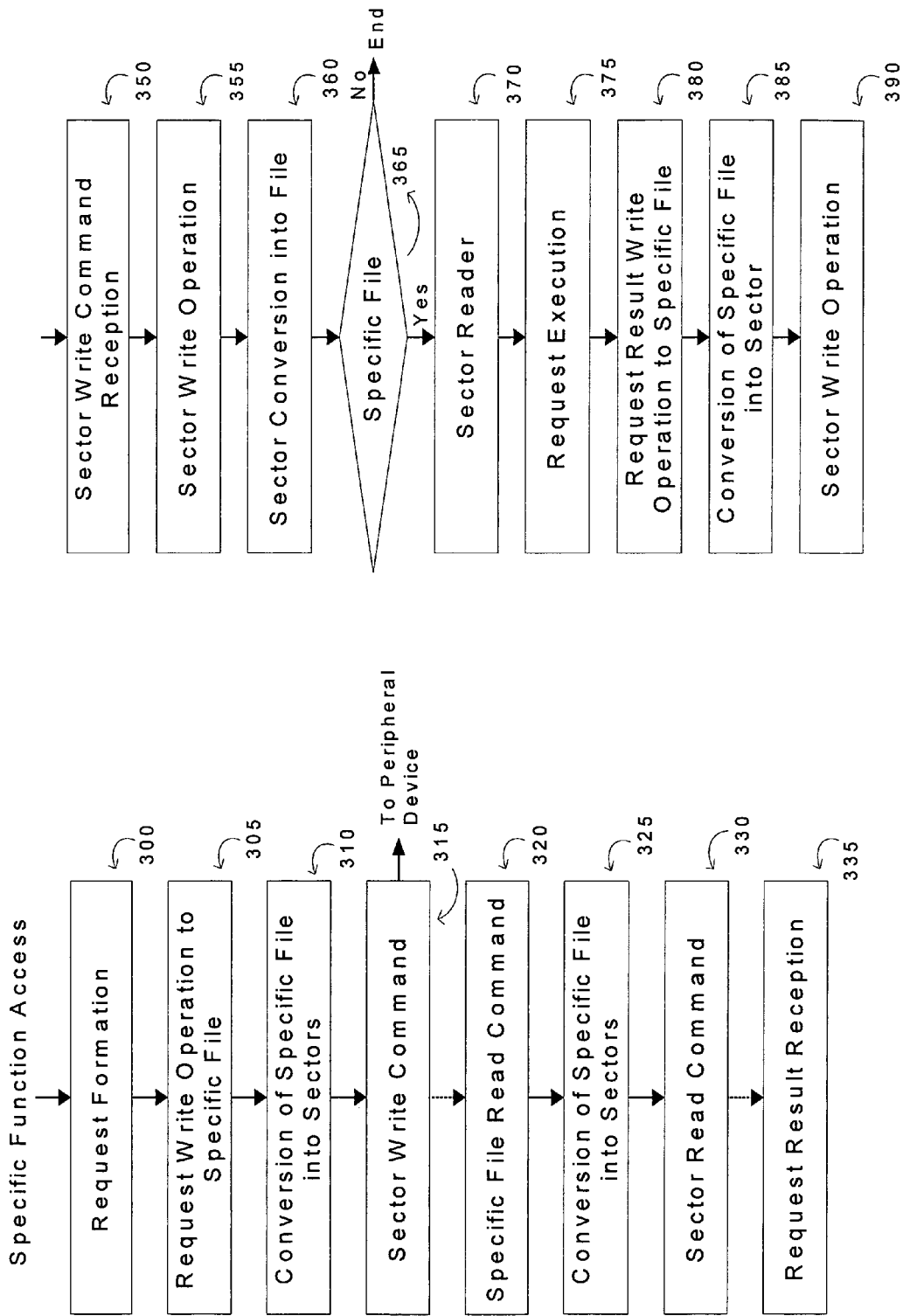
FIG. 3, comprising FIGS. 3a and 3b, diagrammatically illustrates examples of algorithms implemented in the host system and in the peripheral device, respectively, to access a second function of the peripheral device by means of a command targeting a first function of the peripheral device; and, FIG. 4, comprising

With reference to FIG. 3, an exemplary method of the present invention will now be described. FIG. 3, comprising FIGS. 3a and 3b, diagrammatically illustrates examples of algorithms implemented in the host system and in the peripheral device, for example in the peripheral device shown in FIG. 2, respectively, to access a second function of the peripheral device by means of a command targeting a first function of the peripheral device.

The first function is here a storage function whereas the second function is a specific function, not supported by the peripheral device driver used that is not supported by the peripheral device driver corresponding to the identifier of the peripheral device.

The application executed on the host system wanting to access a specific function of the peripheral device forms the corresponding request (step 300). This request is then placed in a specific file having to be stored in a peripheral device (305) by means of a write command.

To write the specific file to a memory of the peripheral device, the specific file is converted into sectors (step 310), preferably into sectors of a particular disk using a predetermined file driver, and a write command of the sectors is executed (step 315). The specific file is thus transmitted to the peripheral device in the form of sectors.

After writing the specific file to the peripheral device, the host system generates a read command of a specific file in the peripheral device to obtain the result of the request (step 320). The specific file to read is converted into sectors to read (step 325), preferably into sectors of a particular disk using a predetermined file driver, and a read command of these sectors is executed (step 330). The host system then requests (step 335) and receives the content of the specific file representing the result of the request.

On reception of a sector write command (step 350), the peripheral device writes the data received to the sectors targeted by the command (step 355). Simultaneously or in a sequential manner, the received sectors are converted into files (step 360) by using a reverse file driver corresponding, preferably, to a predetermined peripheral device driver.

A test is then carried out to determine whether it is a specific file (step 365). If the written sectors do not correspond to a specific file, the algorithm stops. If, on the contrary, the written sectors correspond to a specific file, the sectors previously written are read (step 370) and the request stored in the file corresponding to these sectors is executed (step 375). Alternatively, the content of the sectors is stored in a temporary memory before the test 365 is carried out to prevent, if necessary, a read operation of the sectors (an access to a temporary memory is generally more rapid than an access to a disk).

The result of the request is put in the form of a specific file (step 380) and converted into sectors (step 385) that are written to the disk, preferably a specific disk using a predetermined file driver, of the peripheral device (step 390). The result of the request can thus be accessed by the host system via a read command of the sectors corresponding to the specific file.

As indicated previously, the invention can be implemented with other types of peripheral devices, classes of peripheral devices and/or buses, notably buses of the PCI (acronym for Peripheral Component Interconnect) or PCI Express type.

It is thus possible, for example, to implement a USB mouse supplying cryptographic services. The standard class is here, preferably, the HID class (acronym for Human Interface Device) and the cryptographic services are identified as buttons or additional sensors and accessed without requiring a specific driver.

Likewise, it is possible to implement a PCI or PCI Express network interface providing cryptographic services. The PCI and PCI Express standards enable multifunction peripheral devices analogous to the USB composite peripheral devices to be defined. It is thus possible to implement PCI cards behaving as network cards, representing a first function, and as cards capable of providing cryptographic services, representing a second function.

As illustrated in FIG. 4a, an implementation of such a card includes implementing the cryptographic services as a first function (in the sense of the PCI standard) and the network card part as a second function.

The card 400 here comprises a PCI or PCI Express interface 405 as well as a network interface 410. Depending on the function implemented, the user, or more precisely the operating system of the host system, can access the access services to the network 415 or to the cryptographic services 420.

Such a card nevertheless presents the disadvantage of requiring a specific peripheral device for the cryptographic part.

By implementing the teachings of the invention, the card can only provide a single network card function (in the sense of the PCI standard) and give the visibility of the cryptographic services to the host system as a remote cryptographic server having, for example, a particular IP address (acronym for Internet Protocol) (IP=w.x.y.z) whereas in fact the frames sent to the particular IP address w.x.y.z are processed locally on the card without being sent over the network and the responses are generated as frames emanating from this address.

As illustrated in FIG. 4b, such a card 450 having a PCI or PCI Express interface 455 and a network interface 460 only needs a single peripheral device driver, here of network interface type, to access the network access services 465 of the card where, if the address used is a particular address (IP=w.x.y.z), the command is transmitted to the cryptographic services 470 and, in the other cases (IP≠w.x.y.z), the command is considered as a classic network command.

Such an embodiment also can be envisaged with other types of bus, notably a USB bus for a USB network interface providing cryptographic services. The peripheral device driver can thus be of the CDC class (acronym for Communication Device Class).

From the above description, it is seen that the present invention is a method of processing at least one command in a multifunction peripheral device comprising a communication interface capable of connecting said peripheral device to a host system, said at least one command being in accordance with at least one of the functions of said multifunction peripheral device, called first function, wherein the method comprises the following steps:
  receiving said at least one command,
  processing said at least one command according to said first function,
  analyzing said at least one command to determine whether at least one specific parameter related to at least one other function, separate from said first function, called second function, is associated with said at least one command, and
  in response to said analysis, if at least one specific parameter related to said second function is associated with said at least one command, executing a request related to said second function.

The method according to the invention thus enables a multifunction peripheral device to be connected to a host system that only implements a single peripheral device driver.

According to a particular illustrated embodiment, the method further comprises a processing step of at least one item of data associated with said at least one command to obtain said at least one specific parameter. The method according to the invention is thus capable of taking into account possible specific features related to said first function.

The invention also relates to a method for implementing at least one service of a multifunction peripheral device comprising a communication interface capable of connecting said peripheral device to a host system, said at least one service being called by at least one command in accordance with at least one of the functions of said multifunction peripheral device, called first function, wherein the method comprises the following steps,
  determining the function of said multifunction peripheral device to which belongs said at least one service, and
  if said at least one service does not belong to said first function, associating said at least one command with a reference to said at least one service and with at least one specific parameter to said function of said multifunction peripheral device to which belongs said at least one service.

The method according to the invention thus enables a host system, during the connection of a multifunction peripheral device, to implement only a single peripheral device driver.

In an advantageous manner, said multifunction peripheral device is identified by the host system as a standard peripheral device capable of implementing said first function. The method according to the invention thus enables the host system to use a standard peripheral device driver, without requiring the development and installation of one or more particular peripheral device drivers.

According to particular illustrated embodiments, said at least one specific parameter is an address of an external device or a data storage address. The multifunction peripheral device can thus be recognized as a mass memory or a network interface.

The invention is also directed to a computer program product comprising instructions capable of implementing each of the steps of the method previously described.

The invention is also directed to a device for a multifunction peripheral device comprising a communication interface capable of connecting said peripheral device to a host system, this device comprising processing means of at least one command received through said communication interface, said at least one command being in accordance with at least one of the functions of said multifunction peripheral device, called first function, to enable the execution of a request associated with said at least one command by at least one other function, separate from said first function, called second function.

The device according to the invention thus enables a multifunction peripheral device to be connected to a host system that only implements a single peripheral device driver.

In an advantageous manner, the device further comprises identification means of said peripheral device as a standard peripheral device capable of implementing said first function.

The device according to the invention thus enables the host system to use a standard peripheral device driver, without requiring the development and installation of one or more particular peripheral device drivers.

According to particular illustrated embodiments, the device further comprises processing means of at least one specific parameter associated with said at least one command to identify said second function.

Still according to particular illustrated embodiments, the device further comprises conversion means to obtain said at least one specific parameter from at least one item of data associated with said at least one command. The device according to the invention is thus capable of taking into account possible specific features related to said first function.

Still according to a particular illustrated embodiment, said peripheral device is capable of implementing storage, cryptographic and/or network interface functions. The first function is for example a storage function or a network interface function.

Still according to particular illustrated embodiments, the peripheral device can be of the USB or PCI type.

It will be noted that certain elements of the present invention could be implemented as either hardware, software or firmware components or products or a combination of such, and that description of any specific implementation does not imply that a specific or limiting approach is implied. The description is exemplary in describing one or more preferred embodiments, and alternatives could be determined or designed by one skilled in the art.

Naturally, to satisfy specific requirements, a person skilled in the field of the invention will be able to apply modifications to the previous description and illustrated embodiments.

Moreover, it will be apparent to those skilled in the art that diverse modifications can be made to the embodiment described above, in the light of the above teachings. In the claims that follow, the terms used are not to be interpreted as limiting the claims to the illustrated embodiment, but are to be interpreted to include in it all that the claims aim to cover due to the fact of their formulation and whose prediction is within the scope or reach of those skilled in the art by applying their general knowledge to the implementation of the above described teachings.

Having now described the embodiments of the invention, it will become apparent to one of skill in the arts that other embodiments incorporating the concepts may be used. It is felt, therefore, that these embodiments should not be limited to the disclosed embodiments but rather should be limited only by the spirit and scope of the following claims.

What is claimed is:

1. A multifunction peripheral device comprising a communication interface capable of connecting said peripheral device to a host system, this device comprising processing means of at least one command received through said communication interface, said at least one command being in accordance with at least one of the functions of said multifunction peripheral device, called first function, and the multifunction peripheral device including means to enable the execution of a request associated with said at least one command by at least one other function, separate from said first function, called second function.

2. A device according to the claim 1 further comprising means for identifying said peripheral device as a standard peripheral device capable of implementing said first function.

3. A device according to claim 1 further comprising means for processing at least one specific parameter associated with said at least one command to identify said second function.

4. A device according to claim 3 further comprising conversion means for obtaining said at least one specific parameter from at least one item of data associated with said at least one command.

5. A device according to claim 1, wherein said peripheral device is capable of implementing storage, cryptographic and/or network interface functions.

6. A device according to claim 1, wherein said first function is a storage function or a network interface function.

7. A device according to claim 1, wherein said peripheral device is of the USB type.

8. A device according to claim 1, wherein said peripheral device is of the PCI type.

* * * * *